United States Patent
Matsuyama (10) Patent No.: US 9,102,841 B2
(45) Date of Patent: *Aug. 11, 2015

(54) YELLOW INK COMPOSITION FOR INKJET RECORDING, AND INKJET RECORDING METHOD AND INKJET RECORDED MATERIAL

(71) Applicant: Ricoh Company, Ltd., Ohta-ku (JP)

(72) Inventor: Akihiko Matsuyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,623

(22) Filed: Jul. 12, 2013

(65) Prior Publication Data

US 2014/0065386 A1 Mar. 6, 2014

(30) Foreign Application Priority Data

Aug. 29, 2012 (JP) .................. 2012-188322

(51) Int. Cl.
| | |
|---|---|
| C09D 11/322 | (2014.01) |
| C09D 11/326 | (2014.01) |
| C09D 11/36 | (2014.01) |

(52) U.S. Cl.
CPC .............. C09D 11/36 (2013.01); C09D 11/322 (2013.01); C09D 11/326 (2013.01); Y10T 428/24901 (2015.01)

(58) Field of Classification Search
CPC ........................... C09D 11/322; C09D 11/326
USPC .................................. 106/31.6, 31.75, 31.86
See application file for complete search history.

(56) References Cited

U.S. PATENT DOCUMENTS

| | | |
|---|---|---|
| 2004/0171738 A1 | 9/2004 | Harz et al. |
| 2004/0233262 A1 | 11/2004 | Randler et al. |
| 2006/0229382 A1 | 10/2006 | Schweikart et al. |
| 2007/0197685 A1 | 8/2007 | Aruga et al. |
| 2008/0092773 A1 | 4/2008 | Matsuyama |
| 2008/0233362 A1 | 9/2008 | Kato et al. |
| 2009/0035468 A1 | 2/2009 | Matsuyama et al. |
| 2009/0043028 A1 | 2/2009 | Matsuyama et al. |
| 2009/0047431 A1 | 2/2009 | Hatada et al. |
| 2009/0098312 A1 | 4/2009 | Goto et al. |

(Continued)

FOREIGN PATENT DOCUMENTS

| | | |
|---|---|---|
| CN | 1226209 A | 8/1999 |
| CN | 1529740 A | 9/2004 |

(Continued)

OTHER PUBLICATIONS

U.S. Appl. No. 13/913,626, filed Jun. 10, 2013, Akihiko Matsuyama.

(Continued)

*Primary Examiner* — Helene Klemanski
(74) *Attorney, Agent, or Firm* — Oblon, McClelland, Maier & Neustadt, L.L.P.

(57) ABSTRACT

A yellow ink composition includes a particulate pigment; a dispersant; a water-soluble solvent; and water, wherein the ink composition satisfies the following relationship:

$$0.02 \leq Y/X \leq 0.07 \qquad (1)$$

wherein X represents a maximum absorbance of the ink composition at a wavelength of from 400 to 450 nm; and Y represents an absorbance thereof at a wavelength of 500 nm.

17 Claims, 4 Drawing Sheets

(56) References Cited

U.S. PATENT DOCUMENTS

| | | |
|---|---|---|
| 2009/0169761 A1 | 7/2009 | Szajewski et al. |
| 2009/0176070 A1 | 7/2009 | Goto et al. |
| 2009/0181219 A1 | 7/2009 | Saito et al. |
| 2009/0186162 A1 | 7/2009 | Namba et al. |
| 2010/0285287 A1 | 11/2010 | Matsuyama et al. |
| 2011/0057981 A1 | 3/2011 | Aruga et al. |
| 2011/0183125 A1 | 7/2011 | Aoki et al. |
| 2011/0205288 A1 | 8/2011 | Matsuyama et al. |
| 2011/0216123 A1 | 9/2011 | Tamai et al. |
| 2012/0098883 A1 | 4/2012 | Matsuyama et al. |
| 2012/0207983 A1 | 8/2012 | Matsuyama et al. |
| 2012/0232199 A1 | 9/2012 | Idemura et al. |
| 2012/0236066 A1 | 9/2012 | Tamai et al. |
| 2012/0262517 A1* | 10/2012 | Takaku et al. .................. 347/20 |
| 2012/0293582 A1 | 11/2012 | Goto et al. |
| 2012/0320133 A1 | 12/2012 | Namba et al. |
| 2012/0328853 A1 | 12/2012 | Matsuyama et al. |
| 2013/0023614 A1 | 1/2013 | Hatada et al. |
| 2013/0065028 A1* | 3/2013 | Fujii et al. ................. 428/195.1 |
| 2013/0071637 A1 | 3/2013 | Matsuyama et al. |
| 2013/0194343 A1* | 8/2013 | Yokohama et al. ............. 347/20 |
| 2014/0002539 A1* | 1/2014 | Goto et al. .................. 106/31.75 |
| 2014/0017461 A1* | 1/2014 | Matsuyama ............... 106/31.77 |
| 2014/0069295 A1* | 3/2014 | Fujii et al. .................. 106/31.75 |
| 2014/0072779 A1* | 3/2014 | Matsuyama et al. ....... 106/31.77 |
| 2014/0092180 A1* | 4/2014 | Matsuyama et al. ....... 106/31.75 |

FOREIGN PATENT DOCUMENTS

| | | |
|---|---|---|
| CN | 101270246 A | 9/2008 |
| EP | 2 354 194 A1 | 8/2011 |
| EP | 2 479 222 A1 | 7/2012 |
| GB | 2 349 153 A | 10/2000 |
| JP | 2007-077340 | 3/2007 |

OTHER PUBLICATIONS

Partial European Search Report issued Oct. 4, 2013, in European Patent Application No. 13176356.7.

Combined Chinese Office Action and Search Report issued Sep. 30, 2014 in Patent Application No. 201310378764.X (with English translation of categories of cited documents).

* cited by examiner

YELLOW INK COMPOSITION FOR INKJET RECORDING, AND INKJET RECORDING METHOD AND INKJET RECORDED MATERIAL

CROSS-REFERENCE TO RELATED APPLICATIONS

This patent application is based on and claims priority pursuant to 35 U.S.C. §119 to Japanese Patent Application No. 2012-188322, filed on Aug. 29, 2012, in the Japan Patent Office, the entire disclosure of which is hereby incorporated by reference herein.

BACKGROUND

1. Technical Field

The present invention relates to a yellow ink composition for inkjet recording having high color saturation, glossiness and light resistance, and to an inkjet recording method and inkjet recorded material using the yellow ink composition.

2. Description of the Related Art

Inkjet printers are widely used due to their advantages such as low acoustic noises and low running costs and printers capable of printing color images on plain paper are introduced into the market actively. However, it is extremely difficult to satisfy all the properties required of images produced using such printers, such as good color reproducibility, abrasion resistance, durability, light resistance, drying property, feathering, color bleeding, duplex printing, and ink discharging stability. As a result, ink is selected based on the particular application.

In general, the ink used inkjet recording is mainly composed of water, with a colorant and a wetter such as glycerin to prevent clogging. As the colorant, dyes are widely used for their coloring and stability. However, the light resistance and water resistance of images produced by using such dye-based ink are inferior. The water resistance can be improved in some degree by using specialized recording media having an ink absorbing layer, but is not satisfactory at all when it comes to plain paper.

To compensate for such defects, ink using a pigment has begun to be widely used as a colorant in recent years. Although the pigment ink is successful and superior to the dye ink with regard to light resistance, water resistance, etc., the coloring is degraded by coherence of light having difference wavelengths and phases produced by multiple reflection of light inside the pigment. Therefore, the pigment ink is inferior to the dye ink in general with regard to the coloring. In particular, the pigment ink used as ink for inkjet recording causes problems of deterioration of coloring (color saturation) on plain paper and gloss on specialized paper.

In an attempt to compensate for such degradation of coloring of the pigment ink, pigment particulates that are coated with resin are used. According to this method, the fixing property and the gas resistance property of the ink are further improved by the resin, and in addition dispersion is greatly stabilized. However, currently, pigment ink is not still on a par with dye ink with regard to gloss.

Japanese published unexamined application No. JP-2007-077340-A discloses an aqueous pigment dispersion comprising (A) an isoindoline-based pigment, (B) a pigment derivative obtained by introducing a sulfonic group into an isoindoline-based pigment, (C) water, and (D) a water-soluble organic solvent, characterized in that the ratio of the absorbance of the maximum peak among the peaks of an absorption spectrum in wavelengths of 400 to 800 nm to the absorbance of a valley nipped between peaks existing on the long wavelength side most near to the maximum peak is ≥1.29, which is excellent in dispersion stability and heat resistance. However, colorability and glossiness are not expected to improve. A ratio (Y/X) of an absorbance at 500 nm Y to the absorbance of the maximum peak X needs to be small to improve the colorability and glossiness. Therefore, this is different from the present invention.

The pigment ink has not had colorability and the glossiness better than that of a dye. A method of downsizing primary particles to improve the colorability is suggested. When the primary particles downsize, the absorbance of the maximum peak X at from 400 to 450 nm increases, and the ratio (Y/X) of an absorbance at 500 nm Y thereto decreases to improve the colorability.

However, only controlling the primary particle diameter of the pigment results in poor glossiness on gloss paper and coated papers.

Because of these reasons, a need exist for a yellow ink composition for inkjet recording, imparting colorability and glossiness to gloss papers and coated papers, and having high colorability on plain papers and preventing them from curling.

SUMMARY

Accordingly, one object of the present invention is to provide a yellow ink composition for inkjet recording, imparting colorability and glossiness to gloss papers and coated papers, and having high colorability on plain papers and preventing them from curling.

Another object of the present invention is to provide an inkjet recording method using the yellow ink composition.

A further object of the present invention is to provide inkjet recorded material using the yellow ink composition.

These objects and other objects of the present invention, either individually or collectively, have been satisfied by the discovery of a yellow ink composition, comprising:
a particulate pigment;
a dispersant;
a water-soluble solvent; and
water,
wherein the ink composition satisfies the following relationship:

$$0.02 \leq Y/X \leq 0.07 \tag{1}$$

wherein X represents a maximum absorbance of the ink composition at a wavelength of from 400 to 450 nm; and Y represents an absorbance thereof at a wavelength of 500 nm.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

The present invention provides an ink composition for inkjet recording, imparting colorability and glossiness to gloss papers and coated papers, and having high colorability on plain papers and preventing them from curling.

More particularly, the present invention relates to a yellow ink composition, comprising:
a particulate pigment;
a dispersant;
a water-soluble solvent; and
water,
wherein the ink composition satisfies the following relationship:

$$0.02 \leq Y/X \leq 0.07 \quad (1)$$

wherein X represents a maximum absorbance of the ink composition at a wavelength of from 400 to 450 nm; and Y represents an absorbance thereof at a wavelength of 500 nm.

As yellow pigments for use in the present invention, organic pigments such as azo pigments, disazo pigments, azo methine pigments, anthraquinone pigments, quinophtharone pigments, benzimidazolone pigments, isoindoline pigments, quinacridone pigments and perynone pigments are effectively used.

Specific examples thereof include, but are not limited to, C. I. Pigment Yellow 1 (fast yellow G), 2, 3, 12 (disazo yellow AAA), 13, 14, 16, 17, 20, 23, 24, 34, 35, 37, 53, 55, 73, 74, 75, 81, 83 (disazo yellow FIR), 86, 93, 95, 97, 98 100, 101, 104, 108, 109, 110, 114, 117, 120, 125, 128, 129, 137, 138, 139, 147, 148, 150, 151, 153, 154, 155, 166, 168, 180, 185 and 213.

In the present invention, C. I. Pigment Yellow 155, 180, 185 and 213 are more effectively used.

In order to prepare an ink composition satisfying the relationship (1) of the present invention, the primary particle diameter needs to be smaller than ever before in the process of forming a pigment. The primary particle diameter is preferably 100 nm or less, and more preferably 75 nm or less in a volume-average particle diameter. Dry pulverization methods such as salt milling have mostly been used to downsize the primary particle diameter. Further, micro reactors precipitating a dissolved pigment in a poor solvent at a fine reactive site or liquid phase laser ablations atomizing a pigment with a laser beam having recently been developed can control not only the primary particle diameter but also the shape of the particles. The micro reactor dissolves a pigment in an acid or a solvent and places the solution in a poor solvent to form primary particles. The pigment is precipitated at a very high speed in a fine reactive site to have a small primary particle diameter.

However, even when the pigment has a small primary particle diameter, it is difficult to satisfy Y/X≤0.07, and the pigment needs to be dispersed in a particular way. The particle diameter of the pigment dispersed in an aqueous medium affects Y, and the smaller the smaller the dispersion particle diameter, the smaller the Y. Thus, a pigment dispersion satisfying the formula (1) can be obtained. In order to stably disperse a pigment having a small dispersion particle diameter without reaggregation, it is necessary to disperse the pigment with a weak force while separating. When pigment particles are dispersed by conventional mechanical strong impact, the surface of the pigment has an active fracture cross-section. Therefore, it is difficult to maintain the dispersion status and prevent reaggregation even with a dispersant. Methods of dispersing with a weak force include using ceramic beads having a diameter of 0.05 mm or less, resin beads having a small specific gravity or ultrasonic homogenizers. It is very important to select dispersion methods and dispersants to maintain dispersion stability of pigment particles.

When the primary particle diameter is less than 50 nm in a volume-average particle diameter, light resistance rapidly deteriorates. Therefore, the primary particles need not be miniaturized more than necessary, and light resistance does not deteriorates when 0.02≤Y/X.

Namely, the pigment preferably has a primary volume-average particle diameter of from 50 to 100 nm, and is preferably dispersed with a dispersant and a weak force to have a volume-average particle diameter of from 50 to 100 nm equivalent to the primary particle diameter to obtain an ink composition satisfying the relationship (1).

The concentration of the pigment in the ink is preferably from 1 to 15% by weight, more preferably from 2 to 12% by weight, and furthermore preferably from 3 to 9% by weight. When the concentration thereof is too small, the coloring ability tends to be insufficient so that the image density and the color saturation tend to be inferior. When the concentration thereof is too large, the preservation stability of the ink tends to deteriorate and the image tends to become dull.

—Dispersant—

There is no specific limit to the dispersant for use in the present invention. Any of the dispersants for use in preparation of the liquid dispersion of pigment can be suitably used.

For example, nonion surfactants such as polyoxyethylene isodecyl ether, polyoxyethylene lauryl ether, polyoxyethylene β naphthyl ether, polyoxy ethylene styryl phenyl ether, and polyoxy ethylene distyryl phenyl ether and anion surfactant such as polyoxyethylene lauryl ether sulfate ammonium salts, polyoxyethylene lauryl ether sulfate sodium salts, polyoxyethylene distyryl phenyl ether sulfate ammonium salts, lauryl ether sulfate ammonium salts, lauryl ether sulfate sodium salts, and distyryl phenyl ether sulfate ammonium salts can be used as the dispersants. In the present invention, dispersants having the following formula (2) such as those having formulae (2)-1 to (2)-5 in Table 1 are effectively used.

$$A^1\text{-O}\text{—}B^1 \quad (2)$$

wherein $A^1$ represents a branchable alkyl group having 8 to 12 carbon atoms, a β naphthyl group, a styrenated phenol group or a distyrenated phenol group; $B^1$ represents $COOM^1$, $SO_3M^1$ or $PO_3M^1{}_2$; and $M^1$ represents Na, K, ammonium, tetramethylammonium or ethanolamine. When $B^1$ is $SO_3M^1$, injection stability improves, but the color saturation tends to lower on plain papers. When $B^1$ is $PO_3M^1{}_2$, injection stability slightly deteriorates, but the color saturation tends to improve on plain papers. When $B^1$ is $COOM^1$, injection stability and the color saturation tend to show intermediate characters between $SO_3M^1$ and $PO_3M^1{}_2$.

$M^1$ affects injection stability, organic materials including a nitrogen atom such as ammonium are more preferably used than alkaline metals such as Na and K, and the organic materials including a nitrogen atom and having high molecular weight such as tetramethylammonium and ethanolamine are furthermore preferably used.

TABLE 1

| | $A^1$ | $B^1$ | $M^1$ |
|---|---|---|---|
| (2)-1 | β naphthyl | $COOM^1$ | Tetramethylammonium |
| (2)-2 | Distyrenated phenol | $SO_3M^1$ | $NH_4$ |
| (2)-3 | Straight chain alkyl (C = 12) | $PO_3M^1_2$ | Na |
| (2)-4 | Straight chain alkyl (C = 8) | $COOM^1$ | K |
| (2)-5 | Styrenated phenol | $PO_3M^1_2$ | Ethanolamine |

It is also possible to use polymer dispersants such as polyacrylic acids, polymethacrylic acids, copolymers of acrylic acid and acrylonitrile, copolymers of vinyl acetate and an acrylic acid ester, copolymers of acrylic acid and an acrylic acid alkyl ester, copolymers of styrene and acrylic acid, When $B^1$ is $SO_3M^1$, injection stability improves, but the color saturation tends to lower on plain papers. When $B^1$ is $PO_3M^1_2$, injection stability slightly deteriorates, but the color saturation tends to improve on plain papers. When $B^1$ is $COOM^1$, injection stability and the color saturation tend to show intermediate characters between $SO_3M^1$ and $PO_3M^1_2$.

$M^1$ affects injection stability, organic materials including a nitrogen atom such as ammonium are more preferably used than alkaline metals such as Na and K, and the organic materials including a nitrogen atom and having high molecular weight such as tetramethylammonium and ethanolamine are furthermore preferably used.

TABLE 2

| | $B^1$ | $M^1$ | $R^2$ | $R^3$ | p | q | r | m |
|---|---|---|---|---|---|---|---|---|
| (3)-1 | $PO_3M^1_2$ | $NH_4$ | OH | Hydroxymethyl | 5 | 5 | 5 | 10 |
| (3)-2 | $COOM^1$ | Ethanolamine | OH | Hexyl | 50 | 50 | 50 | 6 |
| (3)-3 | $SO_3M^1$ | Na | Ethoxy | Hydroxyethyl | 35 | 25 | 30 | 1 |
| (3)-4 | $COOM^1$ | K | Methoxy | Ethyl | 50 | 25 | 6 | 6 |
| (3)-5 | $PO_3M^1_2$ | Tetramethylammonium | OH | Methyl | 35 | 5 | 30 | 3 | copolymers of styrene and methacrylic acid, copolymers of styrene, acrylic acid, and an acrylic acid alkyl ester, copolymers of styrene, methacrylic acid, and an acrylic acid alkyl ester, copolymers of styrene, α-methyl styrene, and an acrylic acid, copolymer of styrene, α-methyl styrene, and acrylic acid—copolymers of an acrylic acid alkyl ester, copolymers of styrene and maleic acid, copolymers of vinyl naphthalene and maleic acid, copolymers of vinyl acetate and ethylene, copolymers of vinyl acetate and aliphatic acid vinyl ethylene, copolymers of vinyl acetate and a maleic acid ester, copolymers of vinyl acetate and crotonic acid, and copolymers of vinyl acetate and acrylic acid. These can be used alone or in combination.

In addition, in the present invention, dispersants having the following formula (3) such as those having formulae (3)-1 to (3)-5 in Table 2 are effectively used as well.

(3)

wherein p, q, and r represent a positive integer of from 5 to 50; $B^1$ represents $COOM^1$, $SO_3M^1$, $PO_3M^1_2$; and $M^1$ represents Na, K, ammonium, tetramethylammonium or ethanolamine; $R^1$ represents a site of a polysiloxane structure having the following formula:

wherein $R^2$ represents a hydroxyl group, a methoxy group or an ethoxy group; $R^3$ represents a methyl group, an ethyl group, a hexyl group, a hydroxymethyl group or a hydroxy ethyl group; and m represents a positive integer of from 1 to 10.

The dispersant having the formula (3) is obtained by polymerizing an acrylic monomer and a silane compound.

Specific examples of the acrylic monomer include acrylic ester monomers such as methyl acrylate, ethyl acrylate, butyl acrylate, 2-ethylhexyl acrylate, 2-hydroxyethyl acrylate, acryloylmorpholine and N,N'-dimethylaminoethyl acrylate; methacrylic ester monomers such as methyl methacrylate, ethyl methacrylate, butyl methacrylate, 2-ethylhexyl acrylate, 2-hydroxyethyl methacrylate and N,N'-dimethylaminoethyl methacrylate; amide acrylate such as N-methylol acrylamide and methoxymethylacrylamide; and carboxylic acid containing monomers such as maleic acid, fumaric acid, itaconic acid, acrylic acid and methacrylic acid.

To introduce a polysiloxane group of $R^1$ in the formula (3), monomers generally known as silane coupling agents such as vinyltrimethoxysilane, vinyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl) 3-aminopropylmethyldimethoxysilane, N-2(aminoethyl) 3-aminopropyltrimethoxysilane, N-2(aminoethyl) 3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloric acid salt, 3-ureidopropyltriethoxysilane, 3-chloropropyltrimethoxysilane, 3-mercaptopropylmethyldimethoxysilane, 3-mercaptopropyltrimethoxysilane, bis(triethoxysilyl propyl)tetrasulfide and 3-isocyanate propyltriethoxysilane may be used.

Liquid dispersion elements can be manufactured by dissolving the dispersant specified above in an aqueous medium and adding a coloring pigment to the solution to be wet sufficiently followed by a processing using a Homogenizer for high speed stirring, a mixing and kneading and dispersing machine using balls such as a bead mill or a ball mill, mixing and kneading and dispersing machine applying a shearing force such as a roll mill and an ultrasonic dispersing machine. However, coarse particles tend to remain after the dispersing process, which causes clogging in the inkjet nozzle or the supplying route. Therefore, such coarse particles (e.g., particle diameter: 1 μm or greater) are required to be removed by a filter or a centrifugal.

In the present invention, it is preferable to use the dispersant in an amount of 10 to 100% by weight and, more preferable, from 20 to 50% by weight based on the coloring pigment. When the content of the dispersant is too small, the pigment tends not to be sufficiently refined. When the content of the dispersant is too large, excessive components that are not adsorbed to the pigments tend to have an impact on the ink properties, resulting in deterioration of image blurring, water resistance, and abrasion resistance. In addition, the content of the dispersed particulate in the ink is preferably from about 2 to 20% by weight and more preferably from 3 to 15% by weight based on the total amount of the pigment and the dispersant.

—Water-Soluble Solvent—

The ink of the present invention is prepared by using water as a liquid medium. As the wetter to prevent drying of the ink, improve the dispersion stability and prevent plain papers from curling, the following water-soluble solvents are used. These water-soluble solvents can be used alone or in combination.

Specific examples thereof include, but are not limited to, polyols such as glycerin, ethylene glycol, diethylene glycol, isopropylidene glycerol, 1,3-butane diol, 3-methyl-1,3-butane diol, triethylene glycol, propylene glycol, dipropylene glycol, trimethylol propane, trimethylol ethane, ethylene glycol, diethylene glycol, dipropylene glycol, tripropylene glycol, tetraethylene glycol, hexylene glycol, polyethylene glycol, polypropylene glycol, 1,5-pentane diol, 1,6-hexane diol, glycerol, 1,2,6-hexane triol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether, and ethylene glycol monobenzyl ether; nitrogen-containing heterocyclic compounds such as 2-pyrolidone, N-methyl-2-pyrolidone, N-hydroxyethyl-2-pyrrolidone, 1,3-dimethyl imidazolidinone, ε-caprolactone, and γ-butyllactone; amides such as formamide, N-methylformamide, N,N-dimethylformamide, N,N-dimethyl-β-methoxy propion amide, and N,N-dimethyl-β-butoxy propion amide; amines such as monoethanol amine, diethanol amine, triethanol amine, monoethyl amine, diethyl amine, and triethyl amine; sulfur-containing compounds such as dimethyl sulfoxide, sulfolane, and thiodiethanol; 3-ethyl-3-hydroxymethyl oxetane, propylene carbonate, and ethylene carbonate.

Among these solvents, 3-ethyl-3-hydroxymethyloxetane, isopropylidene glycerol, N,N-dimethyl-β-methoxy propion amide, and N,N-dimethyl-β-butoxy propion amide are particularly preferable. These effectively prevent plain papers from curling.

Sugar groups can also be contained in the wetter in the present invention.

Specific examples of the sugar groups include, but are not limited to, monosaccharides, disaccharides, oligosaccharides (including trisaccharides and tetrasaccharides), and polysaccharides. Preferred examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, α-cyclodextrine and cellulose.

Specific examples of derivatives of these sugar groups include, but are not limited to, reducing sugars, oxidized sugars, amino acid, and thio acid for the sugar groups specified above. Sugar alcohols are particularly preferable and specific examples thereof include, but are not limited to, maltitol and sorbitol.

The blend ratio of the pigment and the wetter has a large impact on the discharging stability of ink injected from a head. If the blending amount of the wetter is too small while the ratio of the solid pigment portion is high, water evaporation around ink meniscus of nozzles tends to be accelerated, resulting in bad discharging performance. The blending ratio of the wetter is preferably from 10 to 70% by weight and more preferably from 20 to 50% by weight based on the ink. The ink having such a content ratio is extremely good about the test for drying, preservation, and reliability.

—Penetrant—

By adding a penetrant to the ink, the surface tension lowers so that the ink filling property of the ink to the nozzles and the discharging stability ameliorate. In addition, since the ink droplets quickly penetrate into a recording medium after the ink droplets have landed thereon, feathering and color bleeding are reduced.

Surfactants and solvents having a penetrating property are used as the penetrant. The surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surfactants include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoroalkyl betaine, perfluoroalkyl amine oxide, and perfluoroalkylether compounds, and the fluorine-based surfactants having the following formula (5) are preferably used.

(5)

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG; manufactured by AIR PRODUCTS and CHEMICALS, INC. (US)}. Among these, SURFYNOL® 104, 465, and TG are particularly good to demonstrate good printing quality.

Specific examples of the solvents having a penetrating property include, but are not limited to, polyols having eight or more carbon atoms such as 2-ethyl-1,3-hexane diol, and 2,2,4-trimethyl-1,3-pentane diol and glycol ethers.

These surfactants may be used alone or in combination. In the present invention, it is preferable to use the penetrant in an amount of 0.01 to 100% by weight and, more preferable, from 0.03 to 2% by weight based on the entire ink. When the content of the surfactant is too small, spreading of dots after printing tends to be poor, i.e., resulting in dots having small diameters so that filling-in in a solid image is not good, thereby degrading the image density and color saturation. When the content of the surfactant is too large, the ink tends to foam, which leads to clogging in the flowing path in the nozzle, resulting in prevention of discharging ink.

Known additives such as pH adjustment agents, antiseptic and antifungal agents, antirust agents, antioxidants, ultraviolet absorbers, oxygen absorbers, light stabilizers, and antikogation agents can be optionally added to the ink composition of the present disclosure.

—pH Adjusting Agent—

The pH adjusting agent is added to stabilize the dispersion state and discharging by maintaining the ink in the stale of alkali. However, when the pH is too high, the head of inkjet and an ink supplying unit tends to be dissolved easily, which results in modification, leakage, bad discharging performance of the ink, etc. It is more desirable to add a pH adjusting agent when the pigment is mixed and kneaded and dispersed together with a dispersing agent in water than when additives such as a wetting agent and a penetrant are added after mixing, kneading, and dispersing. This is because the pH adjusting agent may disrupt the dispersion.

The pH adjusting agent preferably includes at least one of an alcohol amine, an alkali metal hydroxide, an ammonium hydroxide, a phosphonium hydroxide, and an alkali metal carbonate. Specific examples of alcohol amines include, but are not limited to, diethanol amine, triethanol amine, and 2-amino-2-ethyl-1,3-propane diol. Specific examples of the alkali metal hydroxides include, but are not limited to, lithium hydroxide, sodium hydroxide, and potassium hydroxide. Specific examples of the ammonium hydroxides include, but are not limited to, ammonium hydroxide, quaternary ammonium hydroxide, and quaternary phosphonium hydroxide. Specific examples of the alkali metal carbonates include, but are not limited to, lithium carbonate, sodium carbonate, and potassium carbonate.

—Antiseptic Agent and Antifungal Agent—

Specific examples of the antiseptic and antifungal agents include, but are not limited, dehydrosodium acetate, sodium sorbinate, 2-pyridine thiol-1-oxide sodium, sodium benzoate, and pentachlorophenol sodium.

Specific examples of the chelate reagents include, but are not limited to, ethylene diamine sodium tetraacetate, nitrilo sodium triacetate, hydroxyethyl ethylene diamine sodium triacetate, diethylene triamine sodium quinternary acetate, and uramil sodium diacetate.

—Antirust Agent—

Specific examples of the antirust agents include, but are not limited to, acid sulfite, thiosodium sulfate, ammonium thiodiglycolate, diisopropyl ammonium nitrite, pentaerythritol quaternary nitride, and dicyclohexyl ammonium nitrite.

—Antioxidant—

Specific examples of the antioxidants include, but are not limited to, phenol-based antioxidants (including hindered phenol-based antioxidants), amino-based antioxidants, sulfur-based antioxidants, and phosphorous-based antioxidants.

—Ultraviolet Absorber—

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

—Antikogation Agent—

Antikogation agents can be added to the ink composition of the present disclosure.

Kogation represents a problematic phenomenon occurring to a thermal head that injects ink (recording liquid) by utilizing a force of foaming of the ink caused by instant heating upon application of an electric current in a heater. That is, the ink compositions transformed by heating adhere to the heater. If kogation occurs, the heater cannot conduct heating properly so that the ink discharging weakens and the ink is not injected at the worst. Therefore, an antikogation agent is added to the ink composition of the present disclosure to prevent kogation.

Specific examples of the antikogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group, a methylene group, and a carboxylic group.

—Recorder—

The ink composition of the present disclosure can be suitably used in various recorders employing an inkjet recording system, for example, printers, facsimile machines, photocopiers, and multi-functional machines of these for inkjet recording.

Inkjet recorders are described below.

Figure 1:
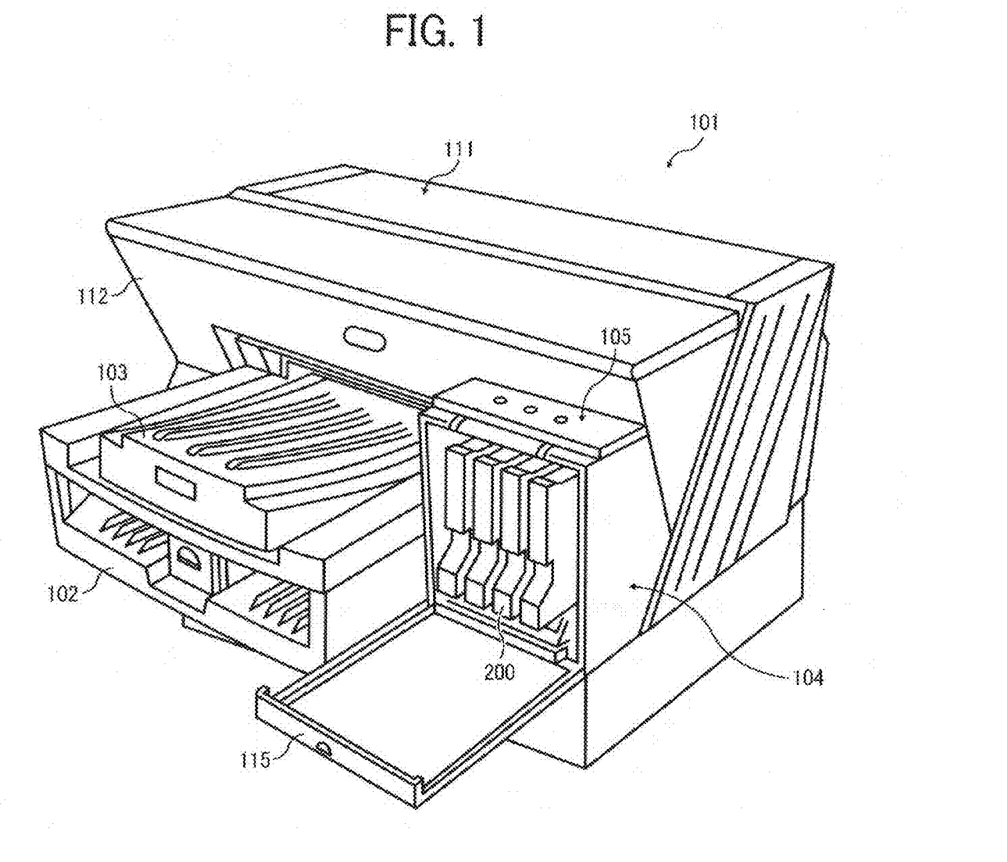
FIG. 1 is a perspective view illustrating an inkjet recorder, in which a cover of a part loading ink cartridges is open.

The inkjet recorder illustrated in FIG. 1 has a main part 101, a sheet feeder tray 102 to feed recording media placed in the main part 101, a discharging tray 103 attached to the main part 101, which stores the recording media on which images are recorded (formed), and an ink cartridge inserting unit 104. On the upper surface of the ink cartridge inserting unit 104 is arranged an operating unit 105 such as operation keys and a display. The ink cartridge inserting unit 104 has a front cover 115 that is openable and closable to detach and attach an ink cartridge 200. "111" represents an upper cover and "112" represents the front of the front cover.

Figure 2:
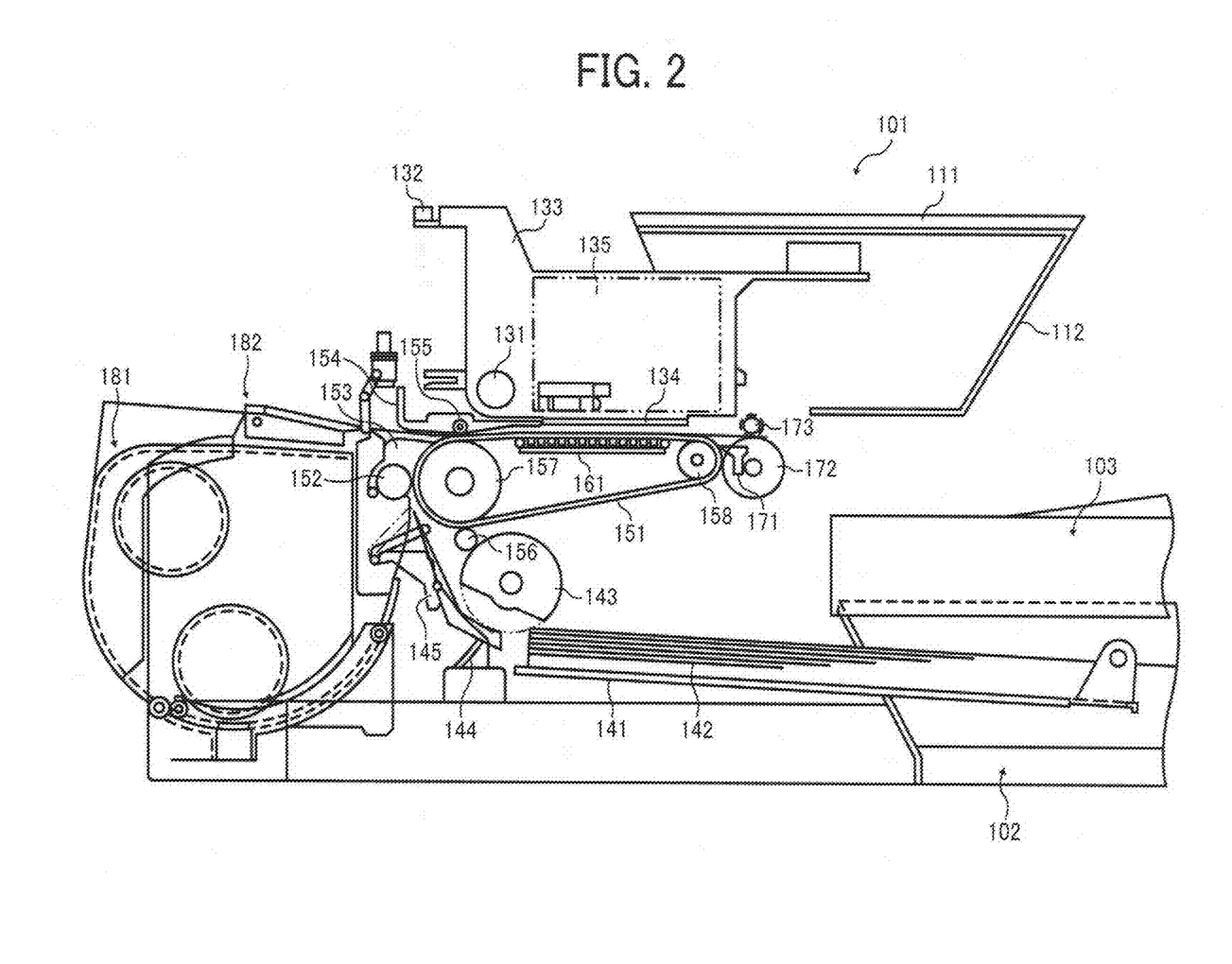
FIG. 2 is a schematic view illustrating an inkjet recorder for explaining the whole structure thereof.

Inside the main part 101, as illustrated in FIG. 2, a guide rod 131 serving as a guiding member that laterally bridges side plates provided on the right hand side and left hand side and a stay 132 hold a carriage 133 slidably movable in the main scanning direction. A main scanning motor moves the carriage 133 for scanning.

The carriage 133 has a recording head 134 having four inkjet recording heads that inject ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to inject ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has a sub tank 135 for each color to supply each color ink to the recording head 134. The ink for inkjet recording of the present disclosure is supplied and replenished to the sub tank 135 from the ink cartridge 200 mounted onto the ink cartridge inserting unit 104 via a tube for supplying ink.

A sheet feeding unit to feed a sheet 142 loaded on a sheet loader (pressure plate) 141 of the sheet feeder tray 103 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased towards the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 follow on the transfer belt 151 by changing the transfer direction of the sheet 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 is an endless form belt, suspended between a transfer roller 157 and a tension roller 158 and rotatable in the belt transfer direction. This transfer belt 151 include, for example, a top layer serving as a sheet adsorption surface made of a resin material such as a copolymer (ETFE) of tetrafluoroethylene and ethylene with no resistance control treatment while having a thickness about 40 µm, and a bottom layer (moderate resistance layer, earth layer) made of the same material as the top layer with resistance control treatment with carbon. On the rear side of the transfer belt 151, a guiding member 161 is arranged corresponding to the printing area by the e recording head 134. A discharging unit to inject the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the main part 101. The duplex printing sheet feeding unit 181 takes in and reverses the sheet 142 that is returned by the reverse rotation of the transfer belt 151 and feeds it again between the counter roller 152 and the transfer belt 151. A manual sheet feeding unit 182 is provided on the upper surface of the duplex printing sheet feeding unit 181.

In this inkjet recorder, the sheet 142 is separated and fed from the sheet feeding unit one by one substantially vertically upward, guided by the guide 145, and transferred while being pinched between the transfer belt 151 and the counter roller 152.

Furthermore, the front end of the sheet 142 is guided by the transfer guide 153 and pressed against the transfer belt 151 by the front end pressure roller 155 to change the transfer direction by substantially 90°.

Since the transfer belt 151 is charged by the charging roller 156 at this point in time, the sheet 142 is electrostatically adsorbed and transferred by the transfer belt 151. By driving the recording head 134 according to the image signal while moving the carriage 133, the ink droplet is injected to the sheet 142 not in motion to record an image for an amount corresponding to one line and thereafter the sheet 142 is transferred in a predetermined amount to be ready for the recording for the next line. On receiving a signal indicating that the recording has completed or the rear end of the sheet 142 has reached the image recording area, the recording operation stops and the sheet 142 is injected to the discharging tray 103.

When the remaining amount of the ink for inkjet recording in the sub-tank 135 is detected as "approaching to empty", a predetermined amount of the ink for inkjet is replenished to the sub tank 135 from the ink cartridge 200

In this inkjet recorder, it is possible to dissemble the chassis of the ink cartridge 200 and replace the ink bags therein when the ink for inkjet is used up in the ink cartridge 200. In addition, the ink cartridge 200 stably supplies the ink for inkjet recording even when the ink cartridge 200 is placed upright (on its side) and installed by front loading. Therefore, even when the main part 101 is blocked upside, for example, it is accommodated in a rack or something is placed on the upper surface of the main part 101, the ink cartridge 200 is easily exchanged.

A serial type (shuttle type) in which the carriage scans is used in this description but this description is true in a line-type inkjet recorder having a line type head.

—Ink Cartridge—

The ink cartridge of the present invention contains a container containing the ink of the present invention therein, and further contains other appropriated selected members as required.

The container is not particularly limited and its shape, structure, size, and material are appropriately selected according to the purpose. Preferred embodiments include those at least having an ink pouch formed by aluminum laminated film or resin film.

Figure 3:
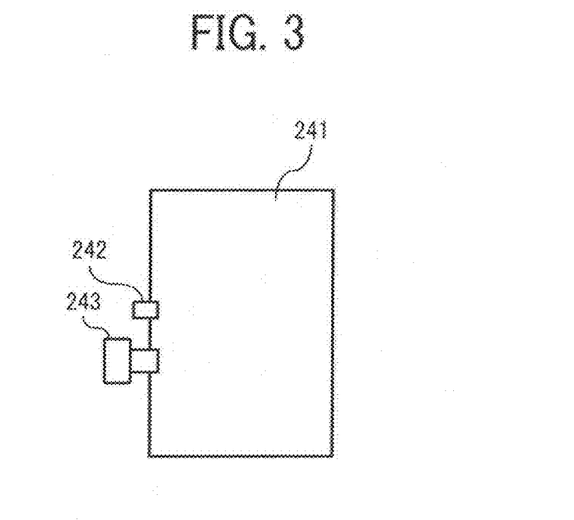
FIG. 3 is a schematic view illustrating an embodiment of ink bag of an ink cartridge.
Figure 4:
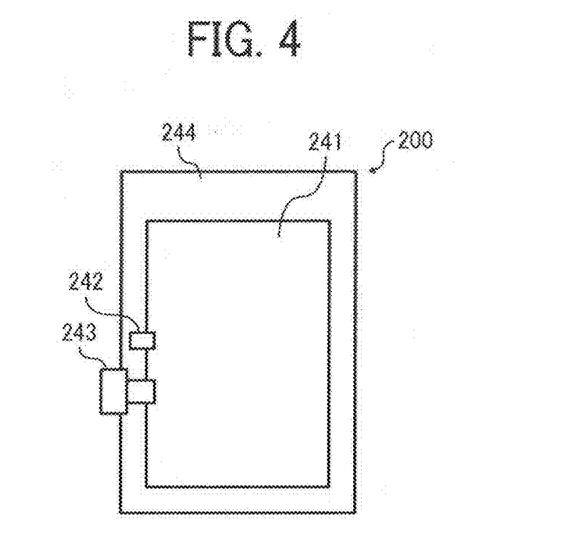
FIG. 4 is a schematic view illustrating an ink cartridge containing the ink bag in FIG. 3 in its cartridge case.

The ink cartridge is hereinafter described with reference to FIGS. 3 and 4. FIG. 3 is an illustration showing an embodiment of the ink cartridge of the present invention. FIG. 4 is an illustration of the ink cartridge of FIG. 3 including a casing (exterior).

In an ink cartridge 200, as shown in FIG. 3, an ink pouch 241 is filled through an ink inlet 242. The ink inlet 242 is closed by fusion bonding after the air is exhausted. An ink outlet 243 made of a rubber material is pierced by a needle on the apparatus body for use, thereby the ink is supplied to the apparatus. The ink pouch 241 is formed by a packaging member such as a non-permeable aluminum laminated film. The ink pouch 241 is housed in a cartridge case 244 generally made of plastics as shown in FIG. 4 and detachably mounted on various types of inkjet recorder.

It is particularly preferable that the ink cartridge of the present invention is detachably mounted on the inkjet recorder of the present invention

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Example 1

Dispersion Element 1

The dispersant having the formula (3)-1 was dissolved in ion-exchanged water, and Ink Jet Yellow 4GC (C.I. Pigment Yellow 155 from CLARIANT Japan K.K.) was added therein. After it was fully wetted, it was pre-dispersed for 10 min by an ultrasonic homogenizer. Then, it was placed in Ultra Apex Mill UAM 015 using zirconia beads of 0.03 mm from KOTOBUKI INDUSTRIES CO., LTD., and dispersed for 120 min. The resulant dispersion element was filtered with a filter of 1 µm to prepare a Dispersion Element 1 having a pigment concentration of 15% by weight.

13

<Ink Formulation>

| | |
|---|---|
| Dispersion Element 1 | 30.0 |
| Glycerin | 20.0 |
| 3-ethyl-3-hydroxymethyloxetane | 10.0 |
| N,N-dimethyl-β-methoxypropionamide | 15.0 |
| 2-ethyl-1,3-hexanediol | 2.0 |
| Surfactant having the formula (5) | 0.05 |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 22.35 |

After preparing a vehicle by dissolving the materials specified above other than the Dispersion Element 1 in ion-exchanged water, it was mixed with the Dispersion Element 1 and filtered with a filter of 1 μm to prepare an ink for inkjet recording.

Example 2

Dispersion Element 2

Methanol having a temperature of −20° C. was flown in a flowing amount of 400 ml/min into a thin-layer reactor (microreactor ULREA from M Technique Co., Ltd.) sandwiched by rotation disks; and a solution having a temperature of 25° C. in which 30 parts of Toner yellow 3GP (C. I. Pigment yellow 155 from CLARIANT Japan K.K.) were dissolved in 970 parts of a strong sulfuric acid in an amount of 10 ml/min. to the rotation disks to precipitate pigment particles. The reaction was continued for five hours and operations of concentration of the thus-obtained pigment liquid dispersion by a centrifugal and dilution thereof with ion-exchanged water were repeated to adjust pH of the resultant to be less than 6 and obtain a pigment paste having a pigment concentration of 30% by weight. Next, 6 parts of a dispersant having the following formula (3)-2 were dissolved in 44 parts of ion-exchanged water, 50 parts of the pigment paste was mixed therein followed by one-hour treatment by an ultrasonic homogenizer. and the resultant was filtered with a filter of 1 μm to prepare a Dispersion Element 2 having a pigment concentration of 15% by weight.

<Ink Formulation>

| | |
|---|---|
| Dispersion Element 2 | 30.0 |
| Glycerin | 20.0 |
| 1,3-butanediol | 25.0 |
| 2-ethyl-1,3-hexanediol | 2.0 |
| EMALGEN LS-106 | 1.0 |
| (polyoxyethylenepolyoxypropylenealkylether from KAO CORPORATION) | |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 21.4 |

After preparing a vehicle by dissolving the materials specified above other than the Dispersion Element 2 in ion-exchanged water, it was mixed with the Dispersion Element 2 and filtered with a filter of 1 μm to prepare an ink for inkjet recording.

Example 3

Dispersion Element 3

The procedure for preparation of the Dispersion Element 1 in Example 1 was repeated except for replacing the pigment

14 with Paliotol Yellow D1155 (C.I. pigment Yellow 185 from BASF Japan Ltd.) and the dispersant with the dispersant having the formula (3)-3 to prepare a Dispersion Element 3 having a pigment concentration of 15% by weight.

<Ink Formulation>

| | |
|---|---|
| Dispersion Element 3 | 30.0 |
| Glycerin | 20.0 |
| 2-pyrrolidone | 10.0 |
| Isopropylidene glycerol | 5.0 |
| N,N-dimethyl-β-methoxypropionamide | 10.0 |
| 2-ethyl-1,3-hexanediol | 2.0 |
| EMALGEN LS-106 | 1.0 |
| (polyoxyethylenepolyoxypropylenealkylether from KAO CORPORATION) | |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 21.4 |

After preparing a vehicle by dissolving the materials specified above other than the Dispersion Element 3 in ion-exchanged water, it was mixed with the Dispersion Element 3 and filtered with a filter of 1 μm to prepare an ink for inkjet recording.

Example 4

Dispersion Element 4

The procedure for preparation of the Dispersion Element 1 in Example 1 was repeated except for replacing the pigment with Hostaperm Yellow H5G (C.I. pigment Yellow 213 from CLARIANT Japan K.K.) and the dispersant with the dispersant having the formula (3)-4 to prepare a Dispersion Element 4 having a pigment concentration of 15% by weight.

<Ink Formulation>

| | |
|---|---|
| Dispersion Element 4 | 30.0 |
| Glycerin | 20.0 |
| 2-pyrrolidone | 10.0 |
| 3-methyl-1,3-butanediol | 15.0 |
| 2-ethyl-1,3-hexanediol | 2.0 |
| Surfactant having the formula (5) | 0.05 |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 22.35 |

After preparing a vehicle by dissolving the materials specified above other than the Dispersion Element 4 in ion-exchanged water, it was mixed with the Dispersion Element 4 and filtered with a filter of 1 μm to prepare an ink for inkjet recording.

Example 5

Dispersion Element 5

The procedure for preparation of the Dispersion Element 2 in Example 2 was repeated except for replacing the pigment with Toner Yellow HG (C.I. pigment Yellow 180 from CLARIANT Japan K.K.) and the dispersant with the dispersant having the formula (3)-5 to prepare a Dispersion Element 5 having a pigment concentration of 15% by weight.

<Ink Formulation>

| | |
|---|---|
| Dispersion Element 5 | 30.0 |
| Glycerin | 20.0 |
| Triethyleneglycolmonobutylether | 10.0 |
| 1,3-butanediol | 15.0 |
| 2-ethyl-1,3-hexanediol | 2.0 |
| Surfactant having the formula (5) | 0.05 |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 22.35 |

After preparing a vehicle by dissolving the materials specified above other than the Dispersion Element 5 in ion-exchanged water, it was mixed with the Dispersion Element 5 and filtered with a filter of 1 μm to prepare an ink for inkjet recording.

Example 6

Dispersion Element 6

The procedure for preparation of the Dispersion Element 1 in Example 1 was repeated except for replacing the pigment with YK11108 (C.I. pigment Yellow 180 from Dainichiseika Color & Chemicals Mfg. Co., Ltd) and the dispersant with the dispersant having the formula (2)-1, and changing the dispersion time with Ultra Apex Mill UAM 015 from KOTOBUKI INDUSTRIES CO., LTD. to 90 min to prepare a Dispersion Element 6 having a pigment concentration of 15% by weight.

<Ink Formulation>

| | |
|---|---|
| Dispersion Element 6 | 30.0 |
| Glycerin | 20.0 |
| 3-methyl-1,3-butanediol | 5.0 |
| 3-ethyl-3-hydroxymethyloxetane | 10.0 |
| N,N-dimethyl-β-methoxypropionamide | 10.0 |
| 2-ethyl-1,3-hexanediol | 2.0 |
| EMALGEN LS-106 | 1.0 |
| (polyoxyethylenepolyoxypropylenealkylether from KAO CORPORATION) | |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 21.4 |

After preparing a vehicle by dissolving the materials specified above other than the Dispersion Element 6 in ion-exchanged water, it was mixed with the Dispersion Element 6 and filtered with a filter of 1 μm to prepare an ink for inkjet recording.

Example 7

Dispersion Element 7

The procedure for preparation of the Dispersion Element 1 in Example 1 was repeated except for replacing the pigment with Paliotol Yellow D1155 (C.I. pigment Yellow 185 from BASF Japan Ltd.) and the dispersant with the dispersant having the formula (2)-2, and changing the dispersion time with Ultra Apex Mill UAM 015 from KOTOBUKI INDUSTRIES CO., LTD. to 90 min to prepare a Dispersion Element 7 having a pigment concentration of 15% by weight.

<Ink Formulation>

| | |
|---|---|
| Dispersion Element 7 | 30.0 |
| Glycerin | 20.0 |
| Triethyleneglycolmonobutylether | 10.0 |
| 2-pyrrolidone | 10.0 |
| 1,3-butanediol | 5.0 |
| 2-ethyl-1,3-hexanediol | 2.0 |
| EMALGEN LS-106 | 1.0 |
| (polyoxyethylenepolyoxypropylenealkylether from KAO CORPORATION) | |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 21.4 |

After preparing a vehicle by dissolving the materials specified above other than the Dispersion Element 7 in ion-exchanged water, it was mixed with the Dispersion Element 7 and filtered with a filter of 1 μm to prepare an ink for inkjet recording.

Example 8

Dispersion Element 8

The procedure for preparation of the Dispersion Element 1 in Example 1 was repeated except for replacing the pigment with Ink Jet Yellow 4G (C.I. pigment Yellow 155 from CLARIANT Japan K.K.) and the dispersant with the dispersant having the formula (2)-3, and changing the dispersion time with Ultra Apex Mill UAM 015 from KOTOBUKI INDUSTRIES CO., LTD. to 60 min to prepare a Dispersion Element 8 having a pigment concentration of 15% by weight.

<Ink Formulation>

| | |
|---|---|
| Dispersion Element 8 | 30.0 |
| Glycerin | 20.0 |
| Ethyleneglycolmonobutylether | 5.0 |
| 1,3-butanediol | 10.0 |
| 3-methyl-1,3-butanediol | 10.0 |
| 2-ethyl-1,3-hexanediol | 2.0 |
| 2-amino-2-ethyl-1,3-propanediol | 0.5 |
| Surfactant having the formula (5) | 0.05 |
| PROXEL LV | 0.1 |
| (antiseptic and antifungal agent from Arch Chemicals Japan) | |
| Ion-exchanged water | 22.35 |

After preparing a vehicle by dissolving the materials specified above other than the Dispersion Element 8 in ion-exchanged water, it was mixed with the Dispersion Element 8 and filtered with a filter of 1 μm to prepare an ink for inkjet recording.

Example 9

Dispersion Element 9

The procedure for preparation of the Dispersion Element 2 in Example 2 was repeated except for replacing the pigment with Paliotol Yellow D1155 (C.I. pigment Yellow 185 from BASF Japan Ltd.) and the dispersant with the dispersant having the formula (2)-4 to prepare a Dispersion Element 9 having a pigment concentration of 15% by weight.

<Ink Formulation>

| | |
|---|---|
| Dispersion Element 9 | 30.0 |
| Glycerin | 20.0 |
| 1,3-butanediol | 15.0 |

| | |
|---|---|
| 3-methyl-1,3-butanediol | 10.0 |
| 2-ethyl-1,3-hexanediol | 2.0 |
| Surfactant having the formula (5) | 0.05 |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 22.35 |

After preparing a vehicle by dissolving the materials specified above other than the Dispersion Element 9 in ion-exchanged water, it was mixed with the Dispersion Element 9 and filtered with a filter of 1 μm to prepare an ink for inkjet recording.

Example 10

Dispersion Element 10

The procedure for preparation of the Dispersion Element 1 in Example 1 was repeated except for replacing the pigment with Hostaperm Yellow H5G (C.I. pigment Yellow 213 from CLARIANT Japan K.K.) and the dispersant with the dispersant having the formula (2)-5, and changing the dispersion time with Ultra Apex Mill UAM 015 from KOTOBUKI INDUSTRIES CO., LTD. to 60 min to prepare a Dispersion Element 10 having a pigment concentration of 15% by weight.

<Ink Formulation>

| | |
|---|---|
| Dispersion Element 10 | 30.0 |
| Glycerin | 20.0 |
| 1,3-butanediol | 25.0 |
| 2-ethyl-1,3-hexanediol | 2.0 |
| 2-amino-2-ethyl-1,3-propanediol | 0.5 |
| EMALGEN LS-106 | 1.0 |
| (polyoxyethylenepolyoxypropylenealkylether from KAO CORPORATION) | |
| PROXEL LV | 0.1 |
| (antiseptic and antifungal agent from Arch Chemicals Japan) | |
| Ion-exchanged water | 21.4 |

After preparing a vehicle by dissolving the materials specified above other than the Dispersion Element 10 in ion-exchanged water, it was mixed with the Dispersion Element 10 and filtered with a filter of 1 μm to prepare an ink for inkjet recording.

Example 11

Dispersion Element 11

The procedure for preparation of the Dispersion Element 1 in Example 1 was repeated except for replacing the pigment with Hostaperm Yellow H5G (C.I. pigment Yellow 213 from CLARIANT Japan K.K.) and the dispersant with EFKA-4520 (modified polyurethane resin having a molecular weight of 16,000 from EFKA Additive Japan K.K.), and changing the dispersion time with Ultra Apex Mill UAM 015 from KOTOBUKI INDUSTRIES CO., LTD. to 60 min to prepare a Dispersion Element 11 having a pigment concentration of 15% by weight.

<Ink Formulation>

| | |
|---|---|
| Dispersion Element 11 | 30.0 |
| Glycerin | 20.0 |
| Triethyleneglycolmonobutylether | 10.0 |
| Isopropylidene glycerol | 10.0 |
| N,N-dimethyl-β-methoxypropionamide | 5.0 |
| 2-ethyl-1,3-hexanediol | 2.0 |
| 2-amino-2-ethyl-1,3-propanediol | 0.5 |
| Surfactant having the formula (5) | 0.05 |
| PROXEL LV | 0.1 |
| (antiseptic and antifungal agent from Arch Chemicals Japan) | |
| Ion-exchanged water | 22.35 |

After preparing a vehicle by dissolving the materials specified above other than the Dispersion Element 11 in ion-exchanged water, it was mixed with the Dispersion Element 11 and filtered with a filter of 1 μm to prepare an ink for inkjet recording.

Example 12

Dispersion Element 12

The procedure for preparation of the Dispersion Element 1 in Example 1 was repeated except for replacing the pigment with Paliotol Yellow D0960 (C.I. Pigment Yellow 138 from BASF Japan Ltd.) and the dispersant with a dispersant having the following formula (4), and changing the dispersion time with Ultra Apex Mill UAM 015 from KOTOBUKI INDUSTRIES CO., LTD. to 60 min to prepare a Dispersion Element 12 having a pigment concentration of 15% by weight.

(4)

<Ink Formulation>

| | |
|---|---|
| Dispersion Element 12 | 30.0 |
| Glycerin | 20.0 |
| 1,3-butanediol | 25.0 |
| 2-ethyl-1,3-hexanediol | 2.0 |
| EMALGEN LS-106 | 1.0 |
| (polyoxyethylenepolyoxypropylenealkylether from KAO CORPORATION) | |
| 2-amino-2-ethyl-1,3-propanediol | 0.5 |
| PROXEL LV | 0.1 |
| (antiseptic and antifungal agent from Arch Chemicals Japan) | |
| Ion-exchanged water | 21.4 |

After preparing a vehicle by dissolving the materials specified above other than the Dispersion Element 12 in ion-exchanged water, it was mixed with the Dispersion Element 12 and filtered with a filter of 1 μm to prepare an ink for inkjet recording.

Comparative Example 1

Dispersion Element 13

The procedure for preparation of the Dispersion Element 3 in Example 3 was repeated except for replacing the pigment with Hansa Yellow 5GX01 (C.I. Pigment Yellow 74 from CLARIANT Japan K.K.) to prepare a Dispersion Element 13 having a pigment concentration of 15% by weight.

<Ink Formulation>

The procedure for preparation of the ink for inkjet recording in Example 3 was repeated except for replacing the Dispersion Element 3 with the Dispersion Element 13.

Comparative Example 2

Dispersion Element 14

The procedure for preparation of the Dispersion Element 12 in Example 12 was repeated except for replacing the pigment with Novoperm Yellow HR02 (C.I. Pigment Yellow 83 from CLARIANT Japan K.K.) to prepare a Dispersion Element 14 having a pigment concentration of 15% by weight.

<Ink Formulation>

The procedure for preparation of the ink for inkjet recording in Example 12 was repeated except for replacing the Dispersion Element 12 with the Dispersion Element 14.

Comparative Example 3

Dispersion Element 15

The procedure for preparation of the Dispersion Element 1 in Example 1 was repeated except for changing the dispersion time with Ultra Apex Mill UAM 015 from KOTOBUKI INDUSTRIES CO., LTD. to 30 min to prepare a Dispersion Element 15 having a pigment concentration of 15% by weight.

<Ink Formulation>

The procedure for preparation of the ink for inkjet recording in Example 1 was repeated except for replacing the Dispersion Element 1 with the Dispersion Element 15.

Comparative Example 4

Pigment Derivative

| | |
|---|---|
| Paliotol Yellow D1155 | 60 |
| C.I. pigment Yellow 185 from BASF Japan Ltd.) | |
| Fuming sulfuric acid | 780 |
| (including SO3 in an amount of 28% by weight) | |

The above Paliotol Yellow D1155 was placed in the fuming sulfuric acid at room temperature while stirred according to the method disclosed in Example 1 of Japanese published unexamined application No. JP-2007-077340-A. After stirred for 2 hrs, the mixture was placed in 1,500 parts of iced water and left for 30 min, and the product was filtered and washed with 300 parts of pure water. Next, the product was placed in 2,000 parts of ammonia to have pH of 7 or more. The product was filtered and the resultant wet crystal was dried at 80° C., and further subjected to process of washing with pure eater, filtering and drying for 10 times to prepare 62 parts of a pigment derivative YS-A. Next, YS-A and pure water were mixed and dialyzed with a dialysis module to prepare a pigment derivative YS-Ad.

<Dispersion Element 16>

| | |
|---|---|
| Paliotol Yellow D1155 | 96 |
| YS-Ad | 24 |
| (Dialyzed material of the pigment derivative which is a sulfonated Paliotol Yellow D1155) | |
| Triethyleneglycolmonobutylether | 180 |
| Ion-exchanged water | 700 |

The above materials were mixed according to the method disclosed in Example 1 of Japanese published unexamined application No. JP-2007-077340-A to prepare a Dispersion Element 16.

<Ink Formulation>

The procedure for preparation of the ink for inkjet recording in Example 7 was repeated except for replacing the Dispersion Element 7 with the Dispersion Element 16, reducing 10 parts of triethyleneglycolmonobutylether to 3.25 parts thereof and 21.4 parts of ion-exchanged water to 20.65 thereof.

TABLE 3

| | IC | | | | | | | | | |
|---|---|---|---|---|---|---|---|---|---|---|
| | | WSS | | | | | | | | |
| | DE | GLY | TEGMBE | 2P | 13BD | MBD | EHO | IPG | DMPA | DBPA |
| Example 1 | 30% | 20% | | | | | 10% | | 15% | |
| Example 2 | 30% | 20% | | | 25% | | | | | |
| Example 3 | 30% | 20% | | 10% | | | | 5% | | 10% |
| Example 3 | 30% | 20% | | 10% | | 15% | | | | |
| Example 5 | 30% | 20% | 10% | | 15% | | | | | |
| Example 6 | 30% | 20% | | | | 5% | 10% | | 10% | |
| Example 7 | 30% | 20% | 10% | 10% | 5% | | | | | |
| Example 8 | 30% | 20% | | | 15% | 10% | | | | |
| Example 9 | 30% | 20% | | | 15% | 10% | | | | |
| Example 10 | 30% | 20% | | 25% | | | | | | |
| Example 11 | 30% | 20% | 10% | | | | | 10% | 5% | |
| Example 12 | 30% | 20% | | 25% | | | | | | |
| Comparative Example 1 | 30% | 20% | | 10% | | | | 5% | | 10% |
| Comparative Example 2 | 30% | 20% | | | 25% | | | | | |

TABLE 3-continued

| | 30% | 20% | | | 10% | 15% |
|---|---|---|---|---|---|---|
| Comparative Example 3 | | | | | | |
| Comparative Example 4 | 37.5% | 20% | 3.25% | 10% | | |

| | IC | | | | | |
|---|---|---|---|---|---|---|
| | Penetrant | | | pH adjuster | Antiseptic | Ion-exchanged |
| | 2E13HD | LS | DSN | AEPD | LV | water |
| Example 1 | 2% | | 0.05% | 0.5% | 0.1% | 22.35% |
| Example 2 | 2% | 1% | | 0.5% | 0.1% | 21.40% |
| Example 3 | 2% | 1% | | 0.5% | 0.1% | 21.40% |
| Example 3 | 2% | | 0.05% | 0.5% | 0.1% | 22.35% |
| Example 5 | 2% | | 0.05% | 0.5% | 0.1% | 22.35% |
| Example 6 | 2% | 1% | | 0.5% | 0.1% | 21.40% |
| Example 7 | 2% | 1% | | 0.5% | 0.1% | 21.40% |
| Example 8 | 2% | | 0.05% | 0.5% | 0.1% | 22.35% |
| Example 9 | 2% | | 0.05% | 0.5% | 0.1% | 22.35% |
| Example 10 | 2% | 1% | | 0.5% | 0.1% | 21.40% |
| Example 11 | 2% | | 0.05% | 0.5% | 0.1% | 22.35% |
| Example 12 | 2% | 1% | | 0.5% | 0.1% | 21.40% |
| Comparative Example 1 | 2% | 1% | | 0.5% | 0.1% | 21.40% |
| Comparative Example 2 | 2% | 1% | | 0.5% | 0.1% | 21.40% |
| Comparative Example 3 | 2% | | 0.05% | 0.5% | 0.1% | 22.35% |
| Comparative Example 4 | 2% | 1% | | 0.5% | 0.1% | 20.65% |

Brevity Code

| | |
|---|---|
| IC | Ink composition |
| DE | Dispersion element |
| WSS | Water-soluble solvent |
| GLY | Glycerin |
| TEGMBE | Triethylglycolmonobutylether |
| 2P | 2-pyrrolidone |
| 13BD | 1,3-butanediol |
| MBD | 3-methyl-1,3-butanediol |
| EHO | 3-ethyl-3-hydroxymethyloxetane |
| IPG | Isopylideneglycerol |
| DMPA | N,N-dimethyl-β-methoxypropionamide |
| DBPA | N,N-dimethyl-β-butoxypropionamide |
| 2E13HD | 2-ethyl-1,3-hexanediol |
| LS | EMALGEN LS-106 (polyoxyethylenepolyoxypropylenealkylether from KAO CORPORATION) |
| DSN | Formula (5) |
| AEPD | 2-amino-2-ethyl-1,3-propanediol |
| LV | PROXEL LV (antiseptic and antifungal agent from Arch Chemicals Japan) |

Evaluation items and methods for the dispersion elements and the inks for recording prepared in Examples and Comparative Examples are mentioned below. The evaluation results are shown in Tables 4, 5-1 and 5-2.

(1) Measurement of Absorbance

Figure 5:
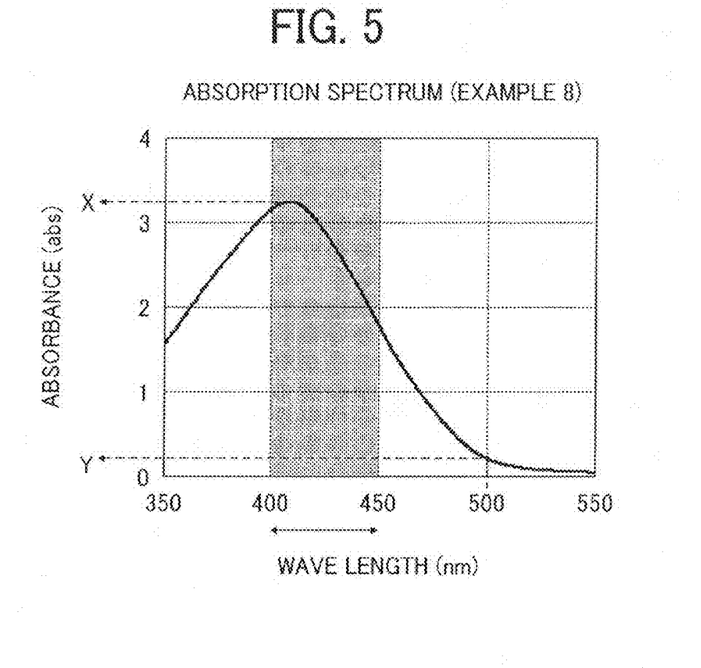
FIG. 5 is a diagram in which absorbances X and Y are determined from an absorption spectrum in Example 8.
Figure 6:
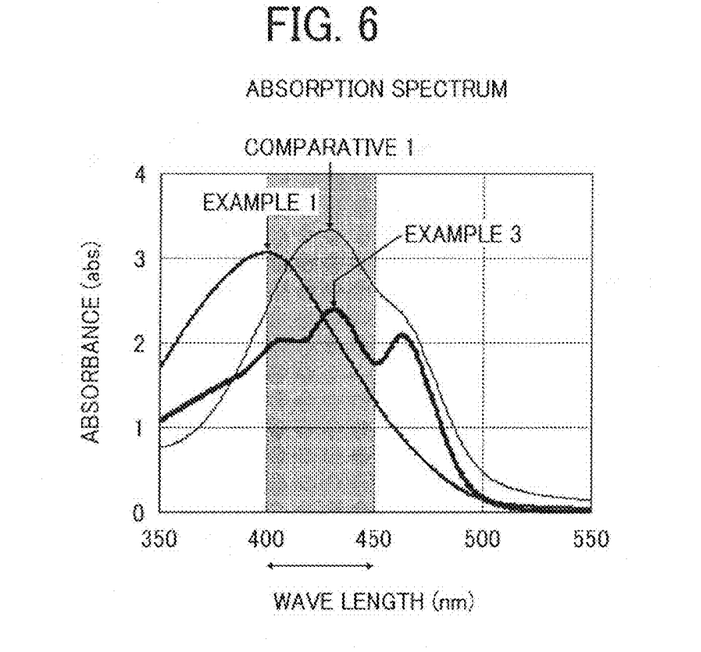
FIG. 6 is a diagram showing absorption spectra in Examples 1 and 3, and Comparative Example 1.

The absorbance was measured with a spectrophotometer U-3310 from Hitachi, Ltd. The reference quartz glass cell was filled with pure water and set in the spectrophotometer. The pigment ink in the present invention has a pigment concentration of 4.5%, which is too high to measure. Therefore, the ink was diluted with pure water by 1/900 and placed in a quartz glass cell having a light path length of 10 mm of the spectrophotometer. At least a visible light range of from 340 to 800 nm was scanned at a sample interval of 5 nm to obtain an absorption spectrum in FIG. 5. FIG. 5 is an absorption spectrum of the ink in Example 8. A maximum absorbance X at a wavelength of form 400 to 450 nm and an absorbance Y at a wavelength of 500 nm are shown in Table 4. FIG. 6 shows absorption spectra of Examples 1 and 3 and Comparative Example 1. X, Y and Y/X of Examples and Comparative Examples are shown in Table 4.

TABLE 4

| | Y/X | Y | X |
|---|---|---|---|
| Example 1 | 0.047 | 0.145 | 3.068 |
| Example 2 | 0.023 | 0.075 | 3.330 |
| Example 3 | 0.069 | 0.166 | 2.390 |
| Example 3 | 0.068 | 0.180 | 2.650 |
| Example 5 | 0.042 | 0.101 | 2.430 |
| Example 6 | 0.068 | 0.154 | 2.276 |
| Example 7 | 0.057 | 0.186 | 3.246 |
| Example 8 | 0.068 | 0.220 | 3.248 |
| Example 9 | 0.049 | 0.130 | 2.640 |
| Example 10 | 0.065 | 0.170 | 2.600 |
| Example 11 | 0.065 | 0.200 | 3.100 |
| Example 12 | 0.059 | 0.190 | 3.200 |
| Comparative Example 1 | 0.143 | 0.476 | 3.339 |
| Comparative Example 2 | 0.170 | 0.450 | 2.640 |
| Comparative Example 3 | 0.090 | 0.280 | 3.128 |
| Comparative Example 4 | 0.071 | 0.100 | 1.400 |

(2) Injection Stability

Each of the inks for recording prepared in Examples and Comparative Examples was filled in printer IPSiO GX e5500 from Ricoh Company, Ltd. in FIGS. 1 and 2, and injection stability thereof was evaluated as follows.

After images were continuously printed for 10 min, a head was covered with a moisturizing cap while the ink adhered thereto. Then, the printer was left in an environment of 50° C. and 60% RH for 1 month, the head was cleaned and images were intermittently printed to evaluate injection stability under the following conditions.

Namely, after 20 images of the following print pattern chart were continuously printed. printing was paused for 20 min. This was repeated 50 times to print 1,000 images in total. Then, one image of the same chart was printed to visually evaluated stripes on 5% chart solid image part, white spots and irregular injection under the following standards. The print pattern has a printed areal ratio of 5% of each color, printed by 100% duty. Recording density was 600×300 dpi at one pass print.

Excellent: No stripes, white spots and irregular injections

Good: Slight stripes, white spots and irregular injections were observed

Fair: Stripes, white spots and irregular injections were observed (unacceptable)

Poor: Stripes, white spots and irregular injections were observed overall (unacceptable)

(3) Curl

Each of the inks for recording prepared in Examples and Comparative Examples was filled in printer IPSiO GX e5500 from Ricoh Company, Ltd. in FIGS. 1 and 2, and a solid image was printed on a recording paper BP-PAPER GF-500 (A4) from Canon, Inc. at a recording density of 600×300 dpi and one pass. The ink amount was adjusted to be 300 to 340 mg/A4. An image printed 10 min before was placed on a flat desk, and a distance from an end of the paper to the desk was measured by a scale. An average of distances from right and left ends of the paper thereto was determined as a curl amount.

Excellent: less than 5 mm

Good: not less than 5 mm and less than 20 mm

Fair: not less than 20 mm and less than 50 mm (Unacceptable)

Poor: the paper forms a tube (Unacceptable)

(4) Color Saturation

Each of the inks for recording prepared in Examples and Comparative Examples was filled in printer IPSiO GX e5500 from Ricoh Company, Ltd. in FIGS. 1 and 2, and a solid image was printed on each of recording papers A: BP-PAPER GF-500 (A4) from Canon, Inc., B: MIRROR COAT Platinum from OH PAPER CO., LTD., and C: CRYSPIA from SEIKO EPSON CORP. at one pass. The luminance of the image after printed and dried was measured by a reflection type color spectrodensitometer X-Rite 938 from X-Rite Inc.

From the obtained values a* and b*, the saturation C* $(=\{(a^*)2+(b^*)_2)\}^{1/2})$ and the ratio k $(=C^*/C^*_0)$ of C* to saturation value of standard color (Japan Color Ver. 2) $C^*_0=91.34$ and evaluated according to the following standard.

Excellent: k≥1.1

Good: 1.1>k≥1.0

Fair: 1.0>k≥0.9 (Unacceptable)

Poor: 0.9>k (Unacceptable)

(5) Glossiness (60°)

Each of the inks for recording prepared in Examples and Comparative Examples was filled in printer IPSiO GX e5500 from Ricoh Company, Ltd. in FIGS. 1 and 2, and a solid image was printed on each of recording papers B: MIRROR COAT Platinum from OJI PAPER CO., LTD. ($G_0=73.8$), and C: CRYSPIA from SEIKO EPSON CORP. ($G_0=64.4$) at one pass. The glossiness of the image after printed and dried was measured by BYK GARDNER 4501 from BYK GARDNER CO., LTD. The gloss difference $\Delta G(=|G_0-G|)$ between the gloss $G_0$ of 0 gradation (surface of a recording medium on which no image is printed) and the gloss G of each gradation other than 0 gradation was measured and evaluated according to the following evaluation standard.

Excellent: |ΔAG|≤10

Good: 10<|ΔG|≤20

Fair: 20<|ΔG|≤40 (Unacceptable)

Poor: 40<|ΔG| (Unacceptable)

(6) Light Resistance

Each of the inks for recording prepared in Examples and Comparative Examples was filled in printer IPSiO GX e5500 from Ricoh Company, Ltd. in FIGS. 1 and 2, and a solid image was printed on a recording paper C: CRYSPIA from SEIKO EPSON CORP.

After printed and dried, the image was irradiated with a xenon feed meter at a black panel temperature of 63° C. for 24 hours, and the change of the image density before and after the irradiation was measured by a reflection type color spectrodensitometer from X-Rite Inc. to obtain a color deterioration ratio t (%) according to the following formula.

$t(\%)=[1-(\text{image density after irradiation})/(\text{image density before irradiation})]\times 100$ Excellent: t<5%

Good: 5%<t≤10%

Fair: 10%<t≤20%

Poor: 20%<t

TABLE 5-1

|  | Injection Stability | Curl A | Color saturation A | Color saturation B | Color saturation C |
|---|---|---|---|---|---|
| Example 1 | Excellent | Excellent | Excellent | Good | Excellent |
| Example 2 | Excellent | Good | Excellent | Excellent | Excellent |
| Example 3 | Excellent | Excellent | Good | Excellent | Excellent |
| Example 4 | Excellent | Good | Excellent | Good | Excellent |
| Example 5 | Good | Good | Excellent | Excellent | Excellent |
| Example 6 | Excellent | Excellent | Good | Good | Excellent |
| Example 7 | Excellent | Good | Good | Good | Excellent |
| Example 8 | Good | Good | Excellent | Excellent | Excellent |
| Example 9 | Good | Good | Excellent | Good | Excellent |
| Example 10 | Good | Good | Excellent | Good | Excellent |
| Example 11 | Good | Excellent | Good | Good | Good |
| Example 12 | Good | Good | Good | Good | Excellent |
| Comparative Example 1 | Excellent | Excellent | Fair | Good | Excellent |
| Comparative Example 2 | Good | Fair | Good | Good | Fair |
| Comparative Example 3 | Good | Excellent | Excellent | Poor | Fair |
| Comparative Example 4 | Excellent | Fair | Poor | Good | Excellent |

TABLE 5-2

|  | Glossiness B | Glossiness C | Light resistance C |
|---|---|---|---|
| Example 1 | Excellent | Excellent | Excellent |
| Example 2 | Excellent | Excellent | Good |
| Example 3 | Good | Excellent | Excellent |
| Example 4 | Good | Excellent | Excellent |
| Example 5 | Excellent | Excellent | Good |
| Example 6 | Good | Excellent | Excellent |

TABLE 5-2-continued

|  | Glossiness | | Light resistance |
| --- | --- | --- | --- |
|  | B | C | C |
| Example 7 | Excellent | Excellent | Excellent |
| Example 8 | Good | Excellent | Excellent |
| Example 9 | Good | Excellent | Good |
| Example 10 | Good | Excellent | Excellent |
| Example 11 | Good | Excellent | Excellent |
| Example 12 | Good | Excellent | Excellent |
| Comparative Example 1 | Fair | Good | Poor |
| Comparative Example 2 | Poor | Fair | Fair |
| Comparative Example 3 | Fair | Fair | Excellent |
| Comparative Example 4 | Good | Excellent | Fair |

Having now fully described the invention, it will be apparent to one of ordinary skill in the art that many changes and modifications can be made thereto without departing from the spirit and scope of the invention as set forth therein.

What is claimed is:

1. A yellow ink composition, comprising:
a particulate pigment;
a dispersant;
a water-soluble solvent; and
water,
wherein the dispersant has the following formula (2):

$$A^1\text{-O-}B^1 \quad (2)$$

wherein $A^1$ represents a branchable alkyl group having 8 to 12 carbon atoms, a β naphthyl group, a styrenated phenol group or a distyrenated phenol group; $B^1$ represents $COOM^1$, $SO_3M^1$ or $PO_3M^1{}_2$; and $M^1$ represents Na, K, ammonium, tetramethylammonium or ethanolamine,
wherein the ink composition satisfies the following relationship:

$$0.02 \leq Y/X \leq 0.07 \quad (1)$$

wherein X represents a maximum absorbance of the ink composition at a wavelength of from 400 to 450 nm; and Y represents an absorbance thereof at a wavelength of 500 nm.

2. The yellow ink composition of claim 1, wherein the pigment is at least one of C. I. Pigment Yellow 155, C. I. Pigment Yellow 180, C. I. Pigment Yellow 185 and C. I. Pigment Yellow 213.

3. The yellow ink composition of claim 1, wherein the water-soluble solvent comprises at least one of 3-ethyl-3-hydroxymethyloxetane, isopropylidene glycerol, N, N-dimethyl-β-methoxy propion amide and N, N-dimethyl-β-butoxy propion amide.

4. An inkjet recording method, comprising:
injecting the yellow ink composition according to claim 1 with an ink injector utilizing a heat energy.

5. An inkjet recording method, comprising:
injecting the yellow ink composition according to claim 1 with an ink injector utilizing a mechanical energy.

6. A recorded material recorded with the yellow ink composition according to claim 1.

7. A yellow ink composition, comprising:
a particulate pigment;
a dispersant;
a water-soluble solvent; and
water,
wherein the ink composition satisfies the following relationship:

$$0.02 \leq Y/X \leq 0.07 \quad (1)$$

wherein X represents a maximum absorbance of the ink composition at a wavelength of from 400 to 450 nm; and Y represents an absorbance thereof at a wavelength of 500 nm,
wherein the dispersant has the following formula (3):

(3)

wherein p, q, and r represent a positive integer of from 5 to 50; $B^1$ represents $COOM^1$, $SO_3M^1$, $PO_3M^1{}_2$; and $M^1$ represents Na, K, ammonium, tetramethylammonium or ethanolamine; $R^1$ represents a site of a polysiloxane structure having the following formula:

wherein $R^2$ represents a hydroxyl group, a methoxy group or an ethoxy group; $R^3$ represents a methyl group, an ethyl group, a hexyl group, a hydroxymethyl group or a hydroxy ethyl group; and m represents a positive integer of from 1 to 10.

8. The yellow ink composition of claim 7, wherein the pigment is at least one of C. I. Pigment Yellow 155, C. I. Pigment Yellow 180, C. I. Pigment Yellow 185 and C. I. Pigment Yellow 213.

9. The yellow ink composition of claim 7, wherein the water-soluble solvent comprises at least one of 3-ethyl-3-hydroxymethyloxetane, isopropylidene glycerol, N,N-dimethyl-β-methoxy propion amide and N, N-dimethyl-β-butoxy propion amide.

10. An inkjet recording method, comprising:
injecting the yellow ink composition according to claim 7 with an ink injector utilizing a heat energy.

11. An inkjet recording method, comprising:
injecting the yellow ink composition according to claim 7 with an ink injector utilizing a mechanical energy.

12. A recorded material recorded with the yellow ink composition according to claim 7.

13. A yellow ink composition, comprising:
a particulate pigment;
a dispersant;
a water-soluble solvent; and
water,
wherein the water-soluble solvent comprises at least one of 3-ethyl-3-hydroxymethyloxetane, isopropylidene glycerol, N, N-dimethyl-β-methoxy propion amide and N, N-dimethyl-β-butoxy propion amide;
wherein the ink composition satisfies the following relationship:

$$0.02 \leq Y/X \leq 0.07 \quad (1)$$

wherein X represents a maximum absorbance of the ink composition at a wavelength of from 400 to 450 nm; and Y represents an absorbance thereof at a wavelength of 500 nm.

14. The yellow ink composition of claim 13, wherein the pigment is at least one of C. I. Pigment Yellow 155, C. I. Pigment Yellow 180, C. I. Pigment Yellow 185 and C. I. Pigment Yellow 213.

15. An inkjet recording method, comprising:
injecting the yellow ink composition according to claim 13 with an ink injector utilizing a heat energy.

16. An inkjet recording method, comprising:
injecting the yellow ink composition according to claim 13 with an ink injector utilizing a mechanical energy.

17. A recorded material recorded with the yellow ink composition according to claim 13.

* * * * *